Sept. 16, 1969     J. P. PIETRZAK     3,466,890
FREEZING TRAY WITH CHAIN ICE CHIPPER
Filed May 19, 1967
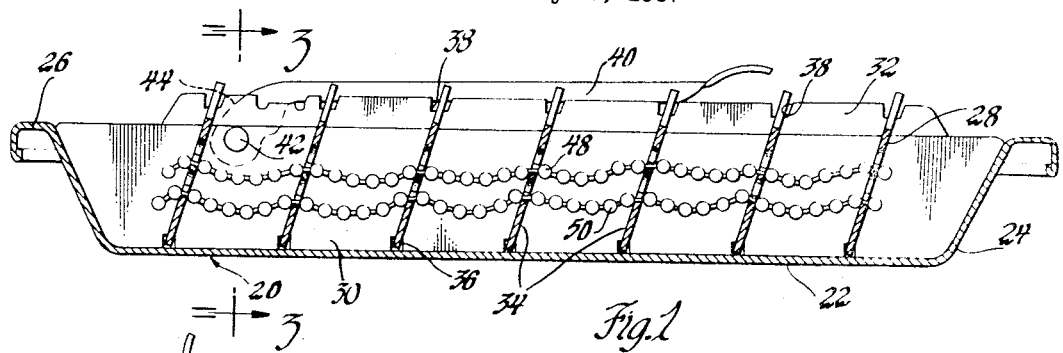
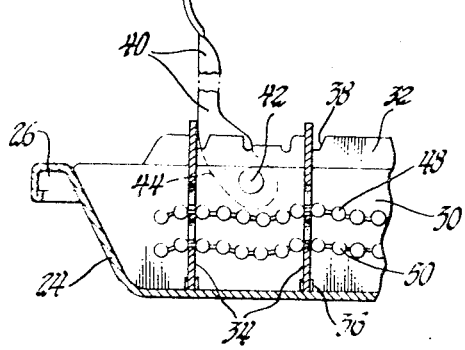
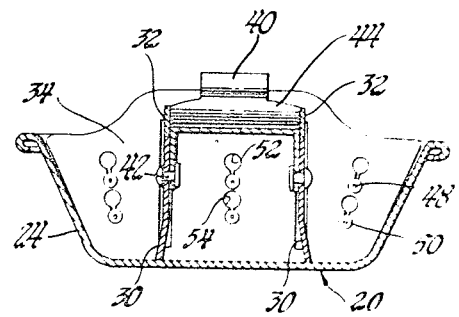
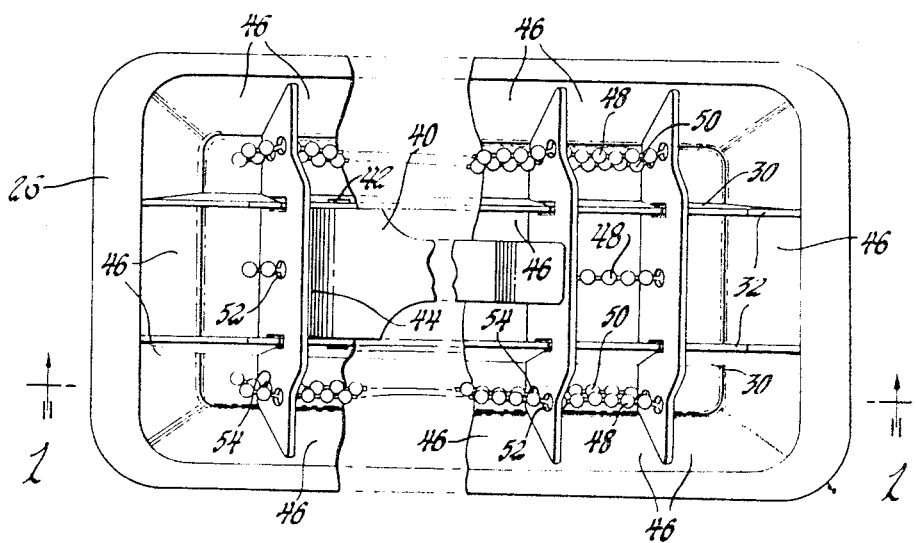
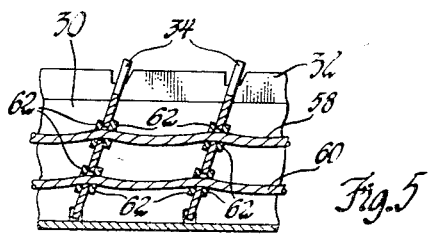
INVENTOR
Joe P. Pietrzak
BY
Carl A. Stickel
ATTORNEY

United States Patent Office 3,466,890
Patented Sept. 16, 1969

3,466,890
FREEZING TRAY WITH CHAIN ICE CHIPPER
Joe P. Pietrzak, Dayton, Ohio, assignor to General Motors Corporation, Detroit, Mich., a corporation of Delaware
Filed May 19, 1967, Ser. No. 639,847
Int. Cl. F25c 1/24
U.S. Cl. 62—320                    5 Claims

ABSTRACT OF THE DISCLOSURE

In the preferred form, a plurality of chains extend longitudinally through keyhole slots in the movable transverse walls of the grid in a substantially catenary suspension. The chains are limited in their movement through the holes by fitting into interlocking arrangement with the slot portions of the keyholes in the transverse walls. The movement of the transverse walls and the chain portion suspended between them relative to the frozen liquid in the compartments between the walls causes the frozen liquid to be cracked upon the ejecting operation of the transverse walls. Flexible wire rope may be substituted for the chains and extends through the transverse walls in a manner similar to the chains.

---

There appears to be a strong demand for a simple, inexpensive trouble-free method and apparatus for producing chipped ice in the home.

It is an object of this invention to crack the frozen liquid in the compartments of a freezing tray or bin by suspending beneath the liquid level from the transverse walls flexible tension devices in one of the forms of string such as chains or wire rope throughout the compartments of the tray.

Further objects and advantages of the present invention will be apparent from the following description, reference being had to the accompanying drawings, wherein preferred embodiments of the present invention are clearly shown.

In the drawings:

FIGURE 1 is a vertical longitudinal sectional view taken along the line 1—1 of FIGURE 4 through a freezing tray shown in the freezing position embodying one form of my invention;

FIGURE 2 is a fragmentary vertical longitudinal sectional view similar to FIGURE 1 showing the apparatus in the ejecting position;

FIGURE 3 is a transverse sectional view taken along the lines 3—3 of FIGURE 1;

FIGURE 4 is a fragmentary top view of the freezing tray shown in FIGURE 1; and

FIGURE 5 is a fragmentary longitudinal sectional view showing a modified form of the invention.

Referring now to the drawings, and more particularly to FIGURE 1, there is shown a freezing tray including an elongated container pan 20 having a bottom 22 with flexing sides and ends 24 and an upper rim 26. The container pan 20 perferably has its interior coated with polytetrafluoroethylene. Within the pan 20 is a grid 28 shown as of the twin bar type having twin lower longitudinal walls 30 spread outwardly at the bottom and twin upper longitudinal walls or bars 32 slidably mounted on top of the lower walls 30. These walls 30 and 32 extend through upwardly extending slots in the spaced transverse walls 34 having webs at the bottom engaging the notches 36 in the bottoms of the lower longitudinal walls 30 and having webs at the top engaging the notches 38 in the tops of the upper longitudinal walls or bars 32. A handle 40 is pivotally connected by the pin 42 to the lower longitudinal walls 30 and has a curved cam surface 44 adapted to engage the front transverse wall 34 to move the twin upper longitudinal walls or bars 32 forwardly to the position shown in FIGURE 2 for the purpose of ejecting frozen liquid from the compartments 46 formed by the walls of the pan 20 and the grid 28. For facilitating the ejection, the pan 20 and the grid 28 are anodized and coated with the coating material disclosed in Patent 3,016,719 issued Jan. 16, 1962.

For the purpose of breaking up the liquid in the compartments 46 after it has been frozen, I provide upper and lower sets of metal chains 48 and 50 extending longitudinally through each of the three rows 46 of the compartments in the tray. This provided for by providing sets of upper and lower keyhole slots 52 and 54 in each of the transverse walls or between the lower longitudinal walls 30 and also between each of the lower longitudinal walls 30 and the adjacent side walls of the pan 20. The bottom keyhole slots 52 and 54 interlock with the links of each of the chains 48 and 50 so as to substantially prevent their movement through the slots. The chains 48 and 50 extend in catenary suspension between the bottoms of the keyhole slots in the transverse walls 34. The tops of the keyhole slots 52 and 54 are sufficiently large to allow the chains to be threaded through the slots 52 and 54. By reason of this arrangement the chains may be readily removed at any time when chipped ice is not desired and may be readily replaced by merely threading the chains through the top of the slots and then allowing the chains to fall to the bottoms of the slots so that the links thereof interlock with the slots.

In operation, the pan 20 is substantially filled with liquid to be frozen to a liquid level substantially above the upper chains 48. The tray is then cooled until the liquid is frozen. When chip ice is desired, the tray containing the frozen liquid is removed and inverted over a container or bin. The handle 40 is pivoted in the counterclockwise direction when viewed as in FIGURE 1 about the pin 42 to cause the cam surface 44 to engage the front transverse wall 34 to move its upper portion as well as the twin longitudinal walls or bars 32 forwardly to the position shown in FIGURE 2. This causes a relative shear type movement of the transverse walls 34. The suspended portions of the chains 48 and 50 resist the shearing stress upon the frozen liquid and thereby cause the cracking of the frozen liquid in the compartments to form chip ice. The cracking spreads from the chains and from various portions of the transverse walls and longitudinal walls to break the ice into small pieces. These are caught by the container or bin, not shown.

In the form shown in FIGURE 5, wire ropes 58 and 60 extend through apertures in the transverse walls 34 and in substantial catenary suspension between the transverse walls 34 on opposite sides of the points where the wire ropes 58 and 60 pass through the transverse walls 34 they are provided with metal projections 62 which prevent the movement of the wire ropes through the transverse walls. These projections 62 may be clamped or soldered to the wire ropes 68, 60 on opposite sides of the transverse walls 62. This second form shown in FIGURE 5 breaks into chips the frozen liquid in a manner similar to the first form.

While the embodiments of the invention as herein disclosed constitutes preferred forms, it is to be understood that other forms might be adopted.

What is claimed is as follows:

1. A freezing tray including a container pan adapted to contain liquid to be frozen to a liquid level substantially filling it, a grid for dividing the interior of the pan into a plurality of compartments comprising a longitudinal wall and spaced movable transverse walls, wherein the improvement comprises flexible strings on opposite sides of said longitudinal wall extending longitudinally in substantially catenary suspension between said transverse walls and supported by said transverse walls beneath said liquid level for cracking the frozen liquid in the compartments, said transverse walls including means for limiting movement of said strings through said transverse walls.

A freezing tray as defined in claim 1 in which the flexible strings are in the form of metal chains located one above the other on opposite sides of said longitudinal wall.

3. A freezing tray as defined in claim 1 in which the flexible strings are in the form of wire rope located one above the other on opposite sides of the transverse walls.

4. A freezing tray including a container pan adapted to contain liquid to be frozen to a liquid level substantially filling it, a grid for dividing the interior of the pan into a plurality of compartments comprising a longitudinal wall and spaced movable transverse walls, said transverse walls being provided with apertures located below the normal liquid level, wherein the improvement comprises flexible chains extending on opposite sides of said longitudinal wall beneath said liquid level through said compartments and said apertures, said apertures having means for limiting the movement of said chains through said apertures.

5. A freezing tray as defined in claim 4 in which the apertures are in the shape of keyholes with the circular portion above the slotted portion in the normal position of the tray, and in which the chains have upright links fitting into the slotted portions of the keyhole apertures.

References Cited

UNITED STATES PATENTS

| | | | |
|---|---|---|---|
| 2,286,693 | 6/1942 | Steenstrup | 249—69 |
| 2,783,619 | 3/1957 | Yates | 249—72 X |
| 3,335,577 | 8/1967 | Strahan et al. | 249—72 X |

J. SPENCER OVERHOLSER, Primary Examiner

ROBERT D. BALDWIN, Assistant Examiner

U.S. Cl. X.R.

249—72